(12) United States Patent
Ledoux et al.

(10) Patent No.: US 10,527,465 B2
(45) Date of Patent: Jan. 7, 2020

(54) REMOVABLE SYSTEM FOR COUNTING WHEEL REVOLUTIONS

(71) Applicant: COMPAGNIE GENERALE DES ETABLISSEMENTS MICHELIN, Clermont-Ferrand (FR)

(72) Inventors: Thomas Ledoux, Clermont-Ferrand (FR); Denis Martin, Clermont-Ferrand (FR); Guillaume Heredia, Clermont-Ferrand (FR); Alexandre Pernot, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 109 days.

(21) Appl. No.: 15/558,684

(22) PCT Filed: Mar. 25, 2016

(86) PCT No.: PCT/EP2016/056714
§ 371 (c)(1),
(2) Date: Sep. 15, 2017

(87) PCT Pub. No.: WO2016/151138
PCT Pub. Date: Sep. 29, 2016

(65) Prior Publication Data
US 2018/0113010 A1   Apr. 26, 2018

(30) Foreign Application Priority Data

Mar. 26, 2015 (FR) ........................ 15 52525
Mar. 26, 2015 (FR) ........................ 15 52526

(51) Int. Cl.
*G01D 11/24* (2006.01)
*B60B 3/16* (2006.01)
(Continued)

(52) U.S. Cl.
CPC ............ *G01D 11/245* (2013.01); *B60B 3/165* (2013.01); *G01C 22/02* (2013.01); *G01D 5/12* (2013.01);
(Continued)

(58) Field of Classification Search
CPC ............... B60B 27/0068; B60B 7/068; B60B 2310/307; B60B 2900/3312;
(Continued)

(56) References Cited

U.S. PATENT DOCUMENTS 1,915,088 A * 6/1933 Eastburg ............... F16B 39/101
411/96
2,423,918 A * 7/1947 Wohlhieter ........... F16B 39/101
411/97
(Continued)

FOREIGN PATENT DOCUMENTS

CN     2628997 Y     7/2004
EP     0 084 764 A1  8/1983
(Continued)

OTHER PUBLICATIONS

STEMCO, Hubodometer Tire Classification Catalog (Year: 1999).*
(Continued)

*Primary Examiner* — Peter J Macchiarolo
*Assistant Examiner* — David L Singer
(74) *Attorney, Agent, or Firm* — Venable LLP

(57) ABSTRACT

A system for counting wheel revolutions made by a wheel of a vehicle, the system including an electronic counter, a transmitter, a housing, and a connector. The electronic counter counts a number of wheel revolutions made by the wheel. The transmitter transmits data from the electronic counter to a remote database. The housing houses the
(Continued)

electronic counter. The connector removably attaches the housing to a nut anti-loosening device installed on the wheel.

13 Claims, 8 Drawing Sheets

(51) Int. Cl.
| | |
|---|---|
| *G01C 22/02* | (2006.01) |
| *G01D 5/12* | (2006.01) |
| *G01D 11/10* | (2006.01) |
| *G01M 17/02* | (2006.01) |
| *G01P 3/487* | (2006.01) |
| *H04B 1/02* | (2006.01) |
| *B60B 7/16* | (2006.01) |

(52) U.S. Cl.
CPC ............ *G01D 11/10* (2013.01); *G01M 17/02* (2013.01); *B60B 7/16* (2013.01); *B60B 2310/306* (2013.01); *B60B 2310/307* (2013.01); *B60B 2320/52* (2013.01); *B60B 2900/331* (2013.01); *G01P 3/487* (2013.01); *H04B 1/02* (2013.01)

(58) Field of Classification Search
CPC ......... B60B 2320/52–524; B60B 3/165; F16B 39/101; G06M 1/062; G01B 3/12; G01M 17/02; G01C 22/00–02
USPC ....... 235/95 B, 103; 377/24.1; 702/163, 165; 73/146
See application file for complete search history.

(56) References Cited

U.S. PATENT DOCUMENTS

| | | | | | |
|---|---|---|---|---|---|
| 3,489,196 | A | * | 1/1970 | Gunter | B60B 3/16 411/96 |
| 3,768,586 | A | * | 10/1973 | Thompson | G05D 1/0265 180/168 |
| 3,946,311 | A | * | 3/1976 | Baker | G01P 3/44 324/167 |
| 4,167,699 | A | * | 9/1979 | Baker | G01P 21/02 324/166 |
| 4,737,057 | A | * | 4/1988 | Olsson | F16B 39/101 411/100 |
| 4,989,222 | A | * | 1/1991 | Lutts | G01C 22/02 235/95 B |
| 5,003,704 | A | * | 4/1991 | Schubert | G01C 22/02 235/95 B |
| 5,294,189 | A | * | 3/1994 | Price | B60B 7/14 301/108.4 |
| 5,503,465 | A | | 4/1996 | Price et al. | 301/37.37 |
| 5,583,482 | A | * | 12/1996 | Chamussy | B60C 23/04 116/34 R |
| 6,011,508 | A | * | 1/2000 | Perreault | B61L 3/225 246/122 R |
| 6,046,672 | A | * | 4/2000 | Pearman | B60C 23/0408 340/442 |
| 6,547,128 | B1 | * | 4/2003 | Shimura | G01C 22/00 235/95 B |
| 2002/0031416 | A1 | * | 3/2002 | Illes | F16B 1/0071 411/87 |
| 2005/0275518 | A1 | * | 12/2005 | Adamson | B60C 23/0452 340/447 |
| 2006/0132356 | A1 | | 6/2006 | Dulac | 342/173 |
| 2006/0142911 | A1 | * | 6/2006 | Allard | B60C 23/0416 701/33.9 |
| 2007/0018837 | A1 | * | 1/2007 | Mizutani | G01P 3/443 340/635 |
| 2009/0192669 | A1 | * | 7/2009 | Vassilieff | B60C 23/0408 701/33.4 |
| 2009/0206218 | A1 | * | 8/2009 | Massey | B60B 7/02 248/220.21 |
| 2009/0226247 | A1 | * | 9/2009 | Taylor | F16B 39/101 403/316 |
| 2011/0129318 | A1 | * | 6/2011 | Davies | B60B 3/165 411/516 |
| 2016/0238714 | A1 | * | 8/2016 | Pyke | G01S 19/40 |
| 2017/0322117 | A1 | * | 11/2017 | Ledoux | G01P 13/02 |
| 2018/0009271 | A1 | * | 1/2018 | Ledoux | B60C 11/246 |

FOREIGN PATENT DOCUMENTS

| | | |
|---|---|---|
| EP | 1 538 351 A1 | 6/2005 |
| EP | 1 669 222 A1 | 6/2006 |
| GB | 2 394 265 A | 4/2004 |
| GB | 2 510 170 A | 7/2014 |
| JP | 2013-133034 A | 7/2013 |
| WO | WO 2013/053760 A1 | 4/2013 |

OTHER PUBLICATIONS

MechaniCalc, Bolted Joint Analysis, (Year: 2019).*
United States Naval Academy, EE302 Lesson 13: Antenna Fundamentals (Year: 2013).*
Radartutorial, Radar Basics—Half-wave Antenna (Year: 2014).*
Changaroth, How Does the Odometer Work? (Year: 2014).*
Jun. 29, 2016 International Search Report and Written Opinion in International Patent Appln. No. PCT/EP2016/056714.
Feb. 1, 2016 Preliminary Search Report and Written Opinion in French Patent Appln. No. 1552525.
Jan. 27, 2016 Preliminary Search Report and Written Opinion in French Patent Appln. No. 1552526.
Sep. 29, 2019 Chinese Official Action in Chinese Patent Appln. No. 201680017980.3.

* cited by examiner

REMOVABLE SYSTEM FOR COUNTING WHEEL REVOLUTIONS

FIELD OF THE INVENTION

The present invention relates to a system for counting wheel revolutions and kilometerage that is intended to be installed on any type of motorized vehicle.

RELATED ART

In professional transport activities, where the notion of cost is very important, it is common to compare the performance of the vehicles, or of certain parts used on the vehicles, as a function of the kilometerage achieved.

This analysis makes it possible for fleet managers, or for service providers working for these fleets, to make the most relevant choices from the technical and economic point of view.

For example, in the case of tires, it is common to compare the "kilometric performance in millimetres" of the tires in order to choose the most economical tire for a given use. The calculation of this indicator can be done very simply by dividing the number of millimetres of rubber to be worn on the tread of the tire by the kilometerage travelled between the first and the last use of the tire.

Another example relates to the monitoring of the fuel consumption of the vehicles. Specifically, it is common to monitor the fuel consumption per kilometer travelled. In this case, that makes it possible, for example, to evaluate the advantage of less fuel-hungry motorization technologies comparatively to their acquisition cost.

Furthermore, on the basis of the knowledge of the kilometerage, the service providers are sometimes caused to propose "kilometric" contracts for their clients, in which the fleet manager pays for the tires used as a function of the kilometerage achieved by the vehicles of the fleet.

This type of offer is particularly advantageous since it prevents the fleet managers from having to buy new tires and allows them to pay for only what is actually consumed.

On the other hand, that requires knowing the kilometerage achieved in order to allow the service provider to charge for the service at the end of each month. This must be able to be done in all cases, even when the vehicles concerned are non-motorized vehicles, which are rarely provided with kilometer counters.

For all these reasons, it is therefore advantageous, for the fleet managers, and equally for their service providers, to know the kilometerage achieved by the vehicles of the fleets.

In order to obtain this measurement, the fleet managers conventionally use hubodometers or telematics systems equipped with GPS.

Hubodometers are systems installed at the hub of the vehicles in order to count the number of revolutions carried out by the axle which is equipped therewith. From this information, it is then possible to determine the kilometerage achieved by multiplying the number of revolutions recorded by the perimeter of the tire present on the vehicle in question.

These systems are generally used on trailers since that makes it possible to equip these non-motorized vehicles with a kilometer counter.

However, it is a solution which has a number of disadvantages because it involves costly equipment which requires costly and complex installation. Specifically, it requires installation by a specialized technician.

Moreover, its use is not very straightforward since the information on the kilometerage achieved must be displayed visually by means of a display arranged on said hubodometer.

Another solution used by the fleet managers consists in equipping their vehicles with telematics systems in order to gather the kilometerage by a GPS system.

However, as in the case of the hubodometers, these systems are costly systems since they require an installation by specialist technicians, on the one hand, and also the payment of a subscription to a telematics company, on the other hand.

Furthermore, these systems lack precision in mountain regions or in urban regions.

Finally, with these systems being deployed by the fleet managers, the service providers acting for these fleets often do not have access to the information coming from these telematics systems.

It is therefore not possible for them to make use of it to charge for any kilometric contract services.

It is therefore the object of the present invention to overcome these difficulties by proposing a system for counting wheel revolutions and kilometerage at low cost that does not require costly installation and that allows the information to be made remotely available for the fleet managers and for their service providers alike.

BRIEF DESCRIPTION OF THE INVENTION

Thus, the invention proposes a system for counting the number of wheel revolutions of a vehicle, comprising:
- an electronic device for counting the number of wheel revolutions,
- a device for transmitting data from the electronic counting device to a remote database,
- the system additionally comprising a housing for receiving the electronic counting device, and attachment means for the removable attachment of the housing to a nut anti-loosening device installed on a wheel of the vehicle.

The nut anti-loosening system can be advantageously designed so as to be able to be adapted to nuts of different sizes and to greater or lesser inter-axis distances between nuts. Thus, the assembly formed by the device for counting wheel revolutions fastened to a nut anti-loosening device is compatible with the greatest number of vehicles present on the market. Note too that the nut anti-loosening device may also be used independently of the present invention.

This assembly can then be fitted manually in a few seconds to the wheel of the vehicle by a technician of the fleet in question or by a technician of a service provider acting for said fleet. The procedure is therefore a simple and rapid mounting procedure.

Thus, in one exemplary embodiment, the attachment means comprise at least one first element secured to the housing and intended to cooperate with at least one second element secured to the anti-loosening device. Preferably, the attachment means comprise elastic engagement means. More precisely, the first and/or second element is a male element intended to cooperate with an opening formed in the housing and/or in the anti-loosening device.

In one embodiment, the housing is thus provided with at least one plastic element intended to be clipped into a hole or a cutout formed in the anti-loosening device. The plastic elements can be circular or rectangular.

Such attachment means have numerous advantages, in particular because they are relatively inexpensive, and because they allow straightforward installation on an anti-loosening device. In a preferred embodiment, the attachment is reversible, thereby making it possible to remove the housing if necessary, for example, for a repair or a change of cell or battery, or a use on another wheel.

Furthermore, these attachment means are such that, in the case where a vehicle does not have an anti-loosening device, it is possible to attach the housing to a hub cap, or flange, installed on a wheel of the vehicle. In certain cases, this attachment requires a few adaptations of the hub cap, for example the formation of holes for receiving the elements secured to the housing.

In another exemplary embodiment, the system further comprises means for taking up force exerted between the housing and the anti-loosening device. These force take-up means are preferably separate from the attachment means in order to avoid a situation in which the acting forces cause detachment or breakage of the housing.

In a preferred embodiment, the electronic device for counting wheel revolutions comprises means for measuring a magnetic field.

In one exemplary embodiment, these means for measuring a magnetic field comprise two sensors whose sensitive axes are arranged in quadrature fashion, that is to say oriented at 90 degrees with respect to one another.

The use of quadrature sensors allows the device to be made less sensitive to external disturbances. Specifically, in the case where the system according to a subject of the invention would be subjected to alternating magnetic fields of linear polarization, commonly present in the area around high-tension lines, transformers or electric motors, the use of two sensors makes it possible to reduce the risk that the disturbances are simultaneously perceived by the sensors.

In an alternative embodiment, it is also possible to operate only with a single sensor in order to reduce the cost of the electronic device for counting wheel revolutions.

In a preferred embodiment, the device for transmitting data comprises means for transmitting the data by Hertzian link, preferably with a short or medium range.

Short or medium range transmission means have the advantage of being more economical from the point of view of electricity consumption. Thus, it is possible to supply the electronic device with a cell or a battery whose life will be a number of years, and will thus not require overly frequent replacements.

Advantageously, one or more devices for transmitting data received by the electronic devices for counting wheel revolutions are installed as close as possible to the place or places where the equipped vehicles pass by.

For example, these devices are situated on the site of the fleet, at toll barriers on the entry to motorways, or else in service stations.

These devices can be web gateways provided, on the one hand, with means for Hertzian-link reception of the frames from the electronic devices for counting wheel revolutions and, on the other hand, long-distance transmission means, such as a GPRS modem or an Ethernet connection.

Alternatively, use can be made, in the devices for counting wheel revolutions, of large-distance but low-throughput data transmission means, termed "narrow band" or "ultra narrow band".

These devices are also advantageous from the point of view of electricity consumption, and are proposed by network operators dedicated to communicating objects.

In this case, it is the network of said operators that plays the role of a device for transmitting data emitted by the first electronic device for counting wheel revolutions to a remote database.

Thus, in one case as in the other, the device for counting wheel revolutions according to a subject of the invention unloads the information on the number of wheel revolutions carried out by the vehicles composing the fleet into a remote database, each time said vehicles return to their parking place, without requiring human intervention.

In an advantageous embodiment, the remote database additionally comprises information concerning the tires mounted on the vehicles, for example the rolling radius, or the perimeter of the tires. This information makes it possible, by means of a simple calculation, to convert the information on the number of revolutions carried out into kilometerage achieved by the equipped vehicle.

In a preferred embodiment, the housing is a protective box made of a non-magnetic material, allowing temperatures ranging between −40° C. and +125° C. to be withstood, for example aluminium or plastic. In order to ensure protection for the electronics for counting wheel revolutions, once the electronics are inserted into the box, it is advantageously possible to embed said electronics into a protective resin.

Alternatively, there can be provided means for hermetically closing said box in order to ensure the sealing necessary for the correct functioning of the electronics, even in rainy use conditions.

In an advantageous embodiment, the nut anti-loosening device comprises two parts, each part comprising:
 a fastening-on-nut device whose diameter is adaptable, and
 means for cooperation with the other part of the system, these means allowing adaptation of the inter-axis distance between the two fastening devices.

In one particular embodiment, the fastening-on-nut device comprises a ring of adaptable diameter. This ring is preferably made of a plastic material and has an interior face that is notched so as to be able to be fastened onto nuts whatever the orientation to which the said nuts are tightened.

In another embodiment, the system further comprises at least one adapter piece installed between the fastening device and the nut and allowing the diameter to be adapted.

In another embodiment, the fastening device comprises means of locking at a given diameter. This locking allows the diameter of the notched ring to be preset to take account of the size of nut on which it will be mounted. These locking means will be described later on and comprise, for example, a tab that can be locked by means of one or more plastic clips, of circular or rectangular shape.

In one preferred embodiment, the cooperation means comprise rails allowing one part of the system to be made to slide relative to the other.

In another embodiment, the cooperation means comprise a male element secured to one part of the system and a female element secured to the other part of the system, the male and female elements cooperating in such a way as to create a pivot connection between the two parts.

Exemplary embodiments of such an anti-loosening device will be subsequently described with the aid of figures.

The invention also relates to a system for calculating the tire performance of a vehicle, comprising a system for counting the number of revolutions according to the invention and additionally comprising means for monitoring the wear of the tires of the vehicle whose kilometerage is measured.

In a preferred embodiment, the means for monitoring the wear of the tires are devices placed on the ground, or manual devices.

Accordingly, the system used for monitoring the wear of the tires can be of any kind. There are those, for example, which are arranged on a rolling ground and which allow the state of wear of the tire to be measured each time a vehicle passes over said system.

Conventionally, these systems use optical measuring means employing lasers.

Alternatively, these measuring means are magnetic and employ eddy current sensors or variable reluctance sensors.

Other systems take the form of a depth gauge and require the intervention of a technician in order to gather information on the state of wear of the tire.

In both cases, these systems can be connected to the remote database used for measuring the kilometerage of the vehicles, and thus allow the calculation of the kilometric performance of the tires used by the vehicles, directly in said database.

In the case where these systems do not have communication means, it is also possible to use them in order to carry out the measurement and to manually enter this measurement into the remote database of the system according to a subject of the invention.

BRIEF DESCRIPTION OF THE FIGURES

Other objectives and advantages of the invention will become more clearly apparent in the following description of a few preferred but non-limiting embodiments illustrated by the appended figures, in which.

DESCRIPTION OF THE BEST EMBODIMENT OF THE INVENTION

Figure 1A:
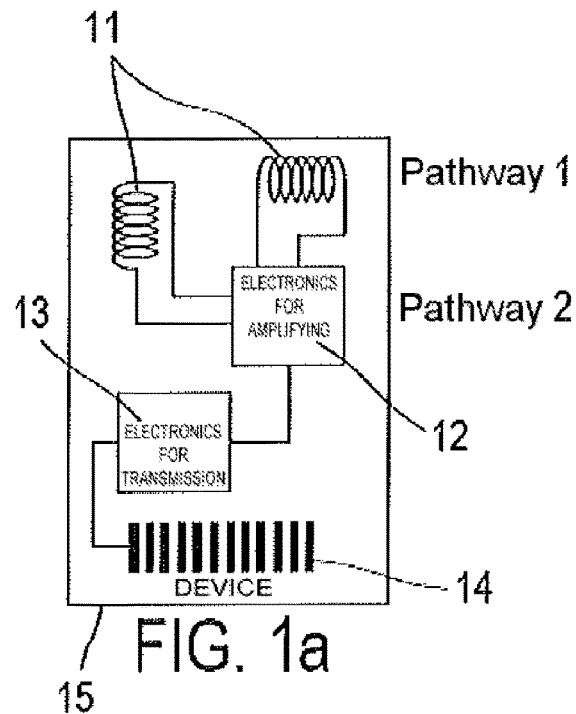
FIGS. 1a and 1b show an exemplary embodiment of an electronic card and its principle of counting wheel revolutions according to the invention.
Figure 1B:
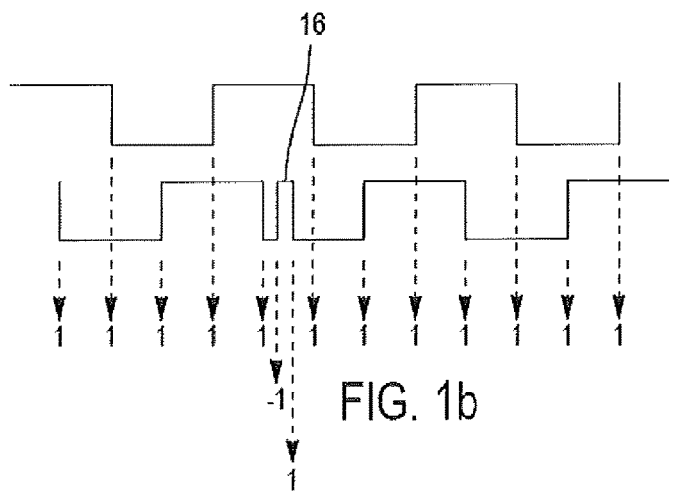

FIGS. 1a and 1b show an exemplary embodiment of an electronic device 15 for counting wheel revolutions employed in a system for counting revolutions according to the invention.

In this example, the wheel revolutions are counted by measuring the Earth's magnetic field from the wheel of the vehicle. In this case, the field measured sees its intensity change sinusoidally in step with the rotation of the wheel. It is thus sufficient to count the periods of said sinusoidal signal to know the number of wheel revolutions carried out.

In the example of FIG. 1a, the Earth's magnetic field is measured by means of two coils 11 whose sensitive axes are oriented at ninety degrees with respect to one another. This configuration provides the system with greater resistance to external electromagnetic disturbances and thus makes it possible to guarantee accuracy in the counting of the wheel revolutions.

Specifically, in the case where the system according to a subject of the invention would be subjected to alternating magnetic fields of linear polarization, commonly present in the area around high-tension lines, transformers or electric motors, it would be unlikely that said disturbances are perceived simultaneously by the two coils.

In the example of FIGS. 1a and 1b, the two coils are connected to electronics 12 for amplifying and counting the periods. These electronics are themselves connected to electronics 13 for remote information transmission by Hertzian link. The information is finally sent using the antenna 14.

FIG. 1b shows an example of the output of each of the two coils after amplification of the sinusoidal signal and adaptation of said signal between zero and five volts by the amplification electronics 12. It illustrates the way in which the wheel revolutions are counted while rejecting any disturbances seen by one of the two pathways.

A counter integrated into the amplification and counting function 12 increases its value by one unit when:
- a rising front on the pathway 1 is associated with a high level on the pathway 2
- a descending front on the pathway 1 is associated with a low level on the pathway 2
- a rising front on the pathway 2 is associated with a low level on the pathway 1
- a descending front on the pathway 2 is associated with a high level on the pathway 1

Any other association of front and level on the two pathways causes the value of the counter to drop by one unit. In this way, the disturbance 16 first of all causes a drop in the value of the counter by one unit, then an increase in the value of this counter by one unit, thus avoiding an additional revolution being counted in an erroneous manner.

In the example of FIGS. 1a and 1b, this exploitation of the quadrature mounting is ensured by an algorithm installed in the electronic function 12, but it is preferably possible to end up with the same result by using an association of flip-flops and Boolean logic functions that is obvious to a person skilled in the art.

Figure 2A:
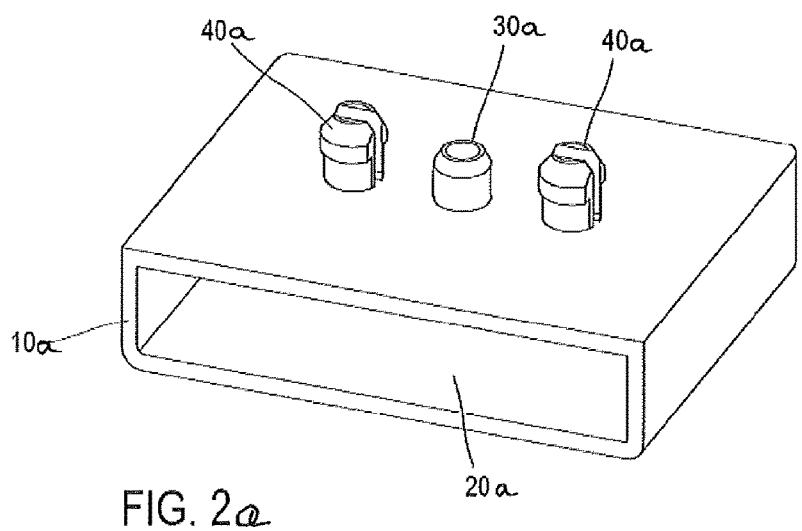
FIG. 2a shows an example of a box containing electronics for counting wheel revolutions according to a subject of the invention.

FIG. 2a shows an exemplary embodiment of a box 10a for protecting the electronics according to a subject of the invention.

In this example, the protective box 10a is a hollow parallelepiped, one face of which has been omitted, with the result that the electronics for counting wheel revolutions, not represented here and described in FIG. 1, can be inserted into the box 10a through the opening 20a thus formed.

In an advantageous embodiment, a protective resin is then poured into the box in order to protect said electronics.

In this example, the box 10a is provided with two circular clips 40a intended to allow the box 10a to be fastened to the nuts or to the rim of a wheel of a vehicle whose kilometerage is to be measured. In an exemplary embodiment, an intermediate part can be positioned between the box 10a and the rim and/or the nuts.

In this example, there can also be seen a centring stud 30a, which advantageously makes it possible to offer a stop for taking up shear forces, in addition to the clips.

In this example, the box is provided with two clips and with one stud. In practice, the number of clips and studs can be different. Advantageously, the number of clips is between one and ten and the number of studs is between one and ten.

Advantageously, the clips and centring studs are all circular such that it is possible to fasten this box 10a to varied interfaces, simply by forming the holes required by means of a drill, in order to insert said clips and studs through said interface. However, it is also possible to produce a box provided with clips and/or studs whose shape is not circular. For example, it is possible to use rectangular clips and/or studs.

In the case where said box 10a, described in FIG. 2a, is fastened to a nut anti-loosening system, the latter must be provided with drillings necessary for inserting the clips and studs present on the box. In this example, the appropriate anti-loosening device would thus be equipped with three holes arranged a line.

Figure 2B:
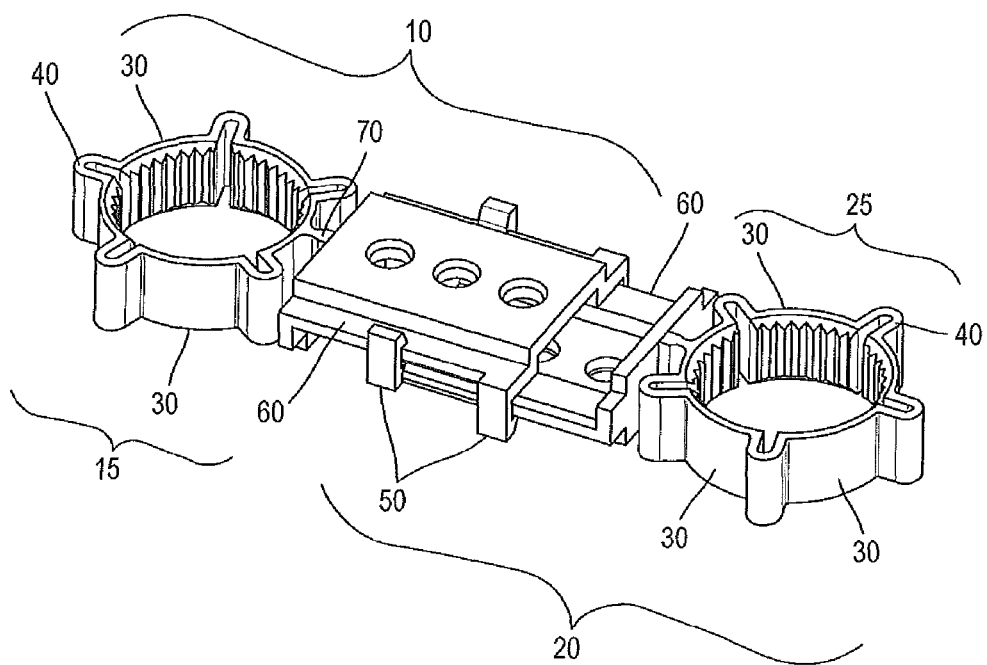
FIGS. 2b and 3a through 3d show two examples of nut anti-loosening devices employed in a system according to the invention.

FIG. 2b shows an exemplary embodiment of a nut anti-loosening system according to one subject of the invention.

In this example, the anti-loosening function is ensured by two identical parts 10 and 20 coupled to one another by a slide connection.

In this example, the slide connection is produced by means of two rails 60, mounted head to foot on one another, and connected to one another by means of rectangular clips 50 arranged on either side of and at the end of each of the rails 60.

Accordingly, the two parts 10 and 20 can slide with respect to one another in order to increase or reduce the distance between the two fastening-on-nut devices 15 and 25.

In this example, the maximum distance between the two fastening-on-nut devices 15 and 25 is reached when the clips 50 come into contact.

Thus, this nut anti-loosening system can be adapted to different inter-nut distances and be used on vehicles in which the method for fastening the wheels is variable.

It should be noted that each of the parts 10 and 20 is formed by a slide connection half and by a fastening-on-nut device. These two elements are connected to one another by a rib 70 whose small thickness makes it possible for the fastening-on-nut device to pivot relatively to the slide connection.

This rib 70 effectively constitutes a deformable connection device which makes it possible to facilitate the mounting of the nut anti-loosening system on a nut pair, since it offers the system an additional degree of freedom.

Furthermore, in this example, each fastening-on-nut device 15 and 25 is produced in the form of a notched ring whose diameter can be adapted to various nut sizes.

To this end, the notched rings forming the devices 15 and 25 are split at a number of points. Each notched ring portion 30 thus obtained is connected to the other ring portions 30 by a U-shaped interface 40.

Thus, the notched ring portions 30 can be moved away from the centres of the fastening-on-nut devices 15 and 25 by deforming the interfaces 40. In doing so, these devices can be positioned on nuts of varying size.

In order to ensure that these U-shaped interfaces have a good deformation capacity, the dimensions of these interfaces, and also the material constituting the parts 10 and 20, are chosen such that the elastic limit/yield strength of the material is not reached even when the fastening-on-nut device is positioned on a nut of large size.

Furthermore, the dimensions of these interfaces, and the material of which the parts 10 and 20 are made are advantageously selected so as to ensure relative gripping, through elastic return, of these fastening-on-nut devices, on the nuts for which they are intended, irrespective of the dimensions of the said nuts.

In this example, each notched ring is provided with five U-shaped interfaces, but that is not mandatory. Preferably, the fastening-on-nut devices can be provided with one to ten U-shaped interfaces.

FIGS. 3a, 3b, 3c and 3d show a second exemplary embodiment of a nut anti-loosening system according to a subject of the invention. This example is preferably intended to be used on heavy goods vehicle or bus wheels.

As in the previous example, the anti-loosening function is ensured by two identical parts coupled to one another by a slide connection 110. In this example, the slide connection is identical to the one described in the example of FIG. 2.

Likewise, each rail constituting the said slide connection is connected to a fastening-on-nut device by a deformable element, as described in FIG. 2.

Thus, this nut anti-loosening system may be adapted to suit different inter-nut distances and be used on vehicles in which the method for fastening the wheels is variable.

Furthermore, in the example of FIGS. 3a, 3b, 3c and 3d, each fastening-on-nut device 120 is produced in the form of a notched ring whose diameter can be adapted to various nut sizes.

To this end, in this example, the notched rings 120 forming the fastening-on-nut devices are split at a single point, opposite the slide, over the entire height of the said notched rings.

On each side of the slot there is on the one hand a tab 130 and on the other hand a rectangular clip 140.

The tab 130 is equipped with an opening in its center, formed over its entire length, whose shape is designed in such a way as to exhibit teeth 150 on the lower and upper part of the said opening. These tooth pairs 150 constitute end stops against which the rectangular clip 140 can be locked.

These end stops are arranged along the tab in such a way as to allow the diameter of the notched ring 120 to be preset for different nut sizes.

In the case of FIGS. 3a, 3b, 3c and 3d there are three possible positions, making it possible for example to preset the diameter of the notched rings 120 for nuts of size 20-7, 30 and 30-2.

Figure 3A:
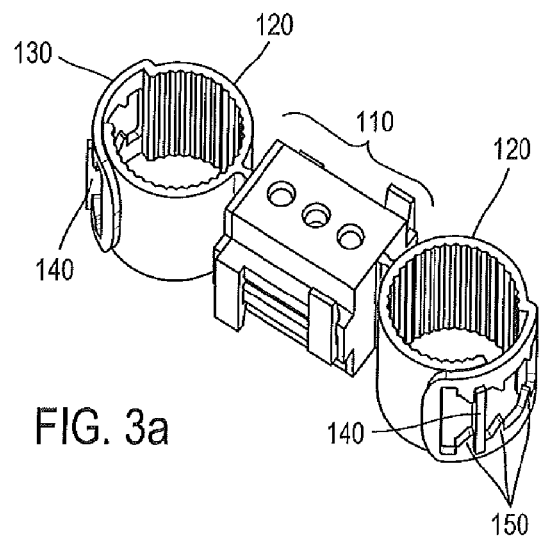
Figure 3D:
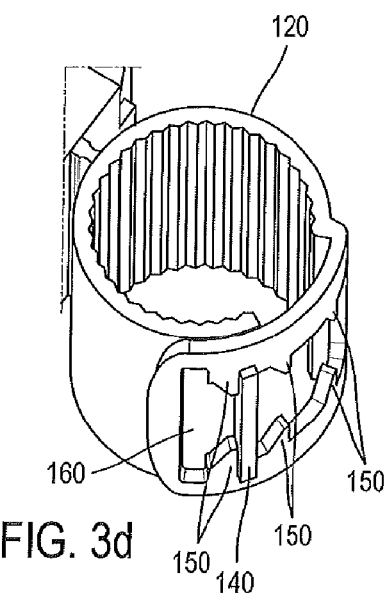

The example of FIG. 3a shows the position of the rectangular clip in the tab for mounting on a size 30-2 nut.

Figure 3B:
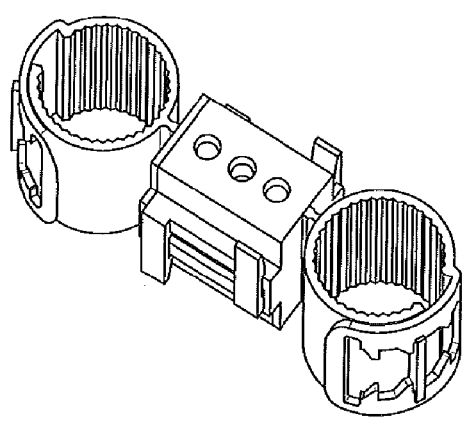

The example of FIG. 3b shows the position of the rectangular clip in the tab for mounting on a size 30 nut.

Figure 3C:
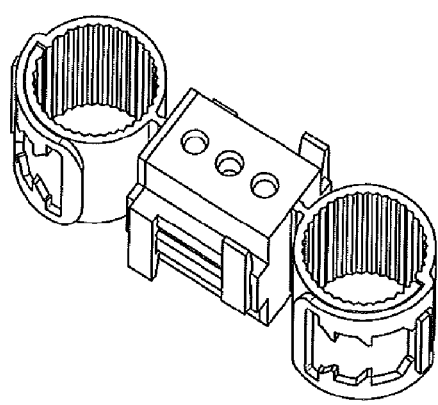

The example of FIG. 3c shows the position of the rectangular clip in the tab for mounting on a size 20-7 nut.

Furthermore, in order to prevent the tab from being able to become detached from the rectangular clip, the latter is designed in such a way that its base is narrower than its upper part.

In order to allow mounting given the shape of the clip, the start of the opening formed in the tab 130 is a slot 160 of which the dimension respectively from bottom to top and from left to right is at least equal to the largest dimension of the clip from bottom to top and from left to right. This slot 160 is visible in particular in drawing 3d which is an enlarged view of a ring of FIG. 3a.

Once engaged in this slot 160, the clip is then slid until it passes the first pair of end stops 150. Having done so, it is then impossible for it to come back out of the opening formed in the tab 130. In this situation, the fastening-on-nut device is ready to be mounted on a 30-2 millimetre nut.

Figure 4A:
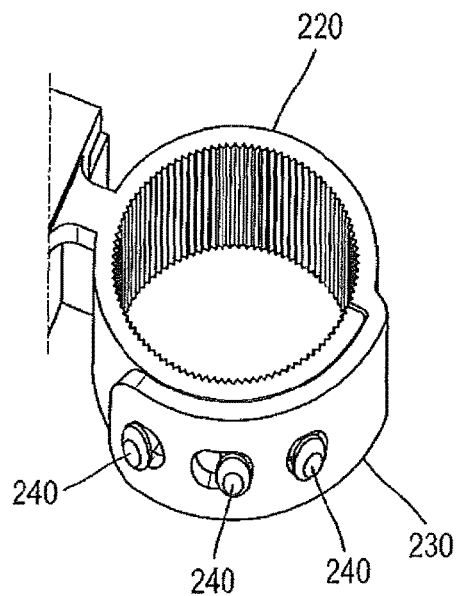
FIGS. 4a through 4c and 5a through 5c show two examples of fastening-on-nut devices used in a system according to the invention, the devices having positions adapted for nuts of various sizes.
Figure 4B:
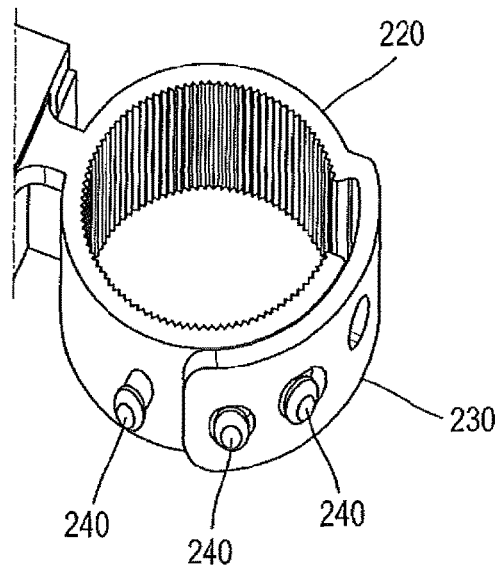
Figure 4C:
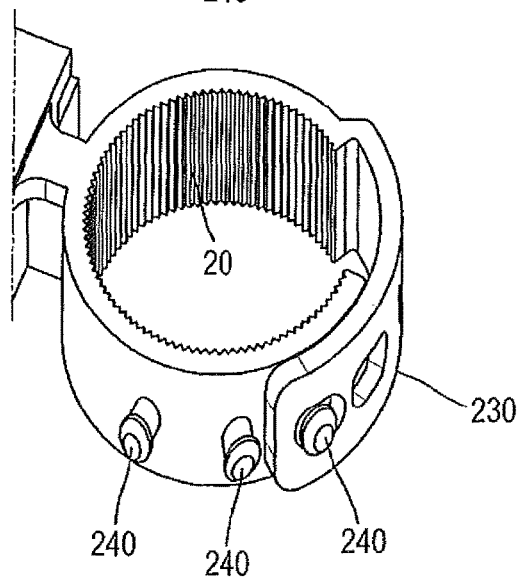

FIGS. 4a, 4b, and 4c show an alternative form of a fastening-on-nut device used in a system according to the invention.

As in the preceding example, the anti-loosening function exhibited in this example of a fastening-on-nut device can be ensured by two identical parts coupled to one another by a slide connection. In FIGS. 4a, 4b and 4c, the said slide connection is not depicted, but it may be identical to the one described in the example of FIG. 2.

Likewise, each rail constituting the said slide connection may be connected to a fastening-on-nut device by a deformable element, as described in FIG. 2.

Thus, this nut anti-loosening system can be adapted to different inter-nut distances and be used on vehicles in which the method for fastening the wheels is variable.

Furthermore, as in the preceding examples, each fastening-on-nut device depicted in FIGS. 4a, 4b and 4c is produced in the form of a notched ring whose diameter can be adapted to various nut sizes.

To this end, in this example, the notched rings 220 that constitute the fastening-on-nut devices are split at a single point, opposite the slide, over the entire height of the said notched rings.

On each side of this slit there are, on the one hand, a tab 230 and on the other hand, three circular clips 240.

The tab 230 is pierced in various positions so as to allow the said tab to be locked on the circular clips 240 at different positions corresponding to the different sizes of nut on which the fastening-on-nut device is to be positioned.

In practice, the number of clips and of holes needs preferably to be greater than 1, but there are a number of possible configurations.

In the case of FIGS. 4a, 4b and 4c there are three possible positions, for example allowing the diameter of the notched rings 220 to be preset for nuts of size of 20-7, 30 and 30-2.

The example of FIG. 4a shows the position of the circular clips in the tab for mounting on a size 20-7 nut.

The example of FIG. 4b shows the position of the circular clips in the tab for mounting on a size 30 nut.

The example of FIG. 4c shows the position of the circular clips in the tab for mounting on a size 30-2 nut.

In these examples, the circular clips are designed so that, once inserted into the holes, the said clips cannot disengage therefrom without human intervention. To this end, their shape, reminiscent of that of a mushroom, is advantageously dimensioned to allow the clips to lock firmly in the holes in the tab.

Figure 5A:
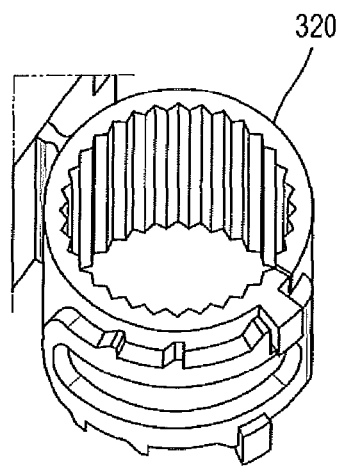
Figure 5B:
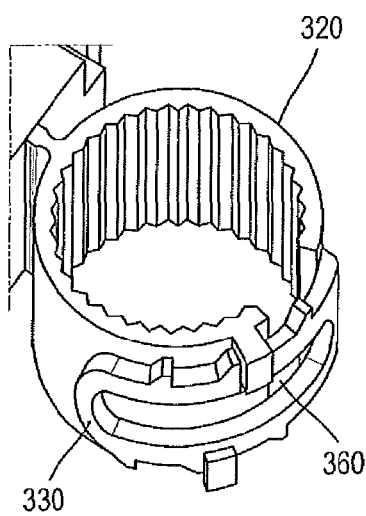
Figure 5C:
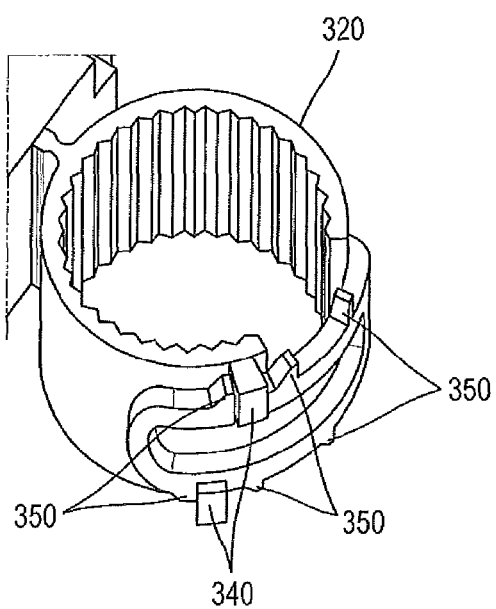

FIGS. 5a, 5b and 5c show a final exemplary embodiment of a nut anti-loosening system according to a subject matter of the invention. This example is preferably intended to be used on heavy goods vehicle or bus wheels.

As in the example of FIGS. 3a, 3b, 3c and 3d, the anti-loosening function is ensured by two identical parts coupled to one another by a slide connection. In this example, the slide connection is identical to the one described in the example of FIG. 2.

Likewise, each rail constituting the said slide connection may be connected to a fastening-on-nut device by a deformable element, as described in FIG. 2.

Thus, this nut anti-loosening system can be adapted to different inter-nut distances and be used on vehicles in which the method for fastening the wheels is variable.

In the example of FIGS. 5a, 5b and 5c, each fastening-on-nut device is produced in the form of a notched ring 320 whose diameter can be adapted to various nut sizes.

To this end, in this example, the notched rings 320 forming the fastening-on-nut devices are split at a single point, opposite the slide, over the entire height of the said notched rings.

On each side of this slot there are, on the one hand, a tab 330 and, on the other hand, two rectangular clips 340.

In this example, the tab 330 is equipped on its external edge with several tooth pairs 350, reminiscent of the shape of a rack and constituting several locking zones allowing the diameter of the ring 320 to be adapted to various nut sizes.

In practice, the rectangular clips 340 become wedged against the teeth 350 so as to block the diameter of the notched ring to the appropriate setting.

Furthermore, the tab 330 is equipped with an opening 360 formed at its center, over the entire length thereof, and advantageously sized so that the said tab can deform when passing from one locking zone to the other. This arrangement allowing facilitated adjustment of the locking-on-nut device.

In this example, just as in the example of FIGS. 3a, 3b and 3c, there are three possible positions making it possible for example to preset the diameter of the notched rings 20 to nuts of size 20-7, 30 and 30-2 nut.

The example of FIG. 5a shows the position that the fastening-on-nut system needs to adopt for mounting on a size 20-7 nut.

The example of FIG. 5b shows the position that the fastening-on-nut system needs to adopt for mounting on a size 30 nut.

The example of FIG. 5c shows the position that the fastening-on-nut system needs to adopt for mounting on a size 30-2 nut.

Figure 6A:
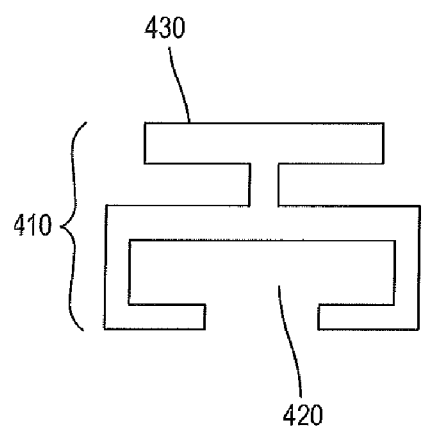
FIG. 6a shows a cross section of an example of an interconnection structure for a fastening-on-nut device according to the invention.
Figure 6B:
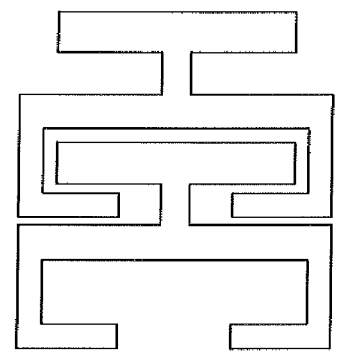
FIG. 6b shows a cross section of two such structures interconnected with each other.

FIGS. 6a and 6b show a cross section of one example of a device for interconnecting fastening-on-nut devices according to the invention.

In this example, the connecting device is made up of two rails the one sliding in the other.

To this end, each rail 410 is made up of a male part 430 and of a female part 420. To create a slide all that is then required is for a male part of one rail to be inserted in the female part of another rail. This configuration is visible in the drawing of FIG. 6b.

In this example, there is no clip present on the rails that make up the slide of the connection device. As a result, if the two fastening-on-nut devices each situated at an opposite end of each of the two rails are separated by too great a distance there is no end stop to prevent the two parts from being separated, as has happened in the example of FIG. 2.

Figure 7A:
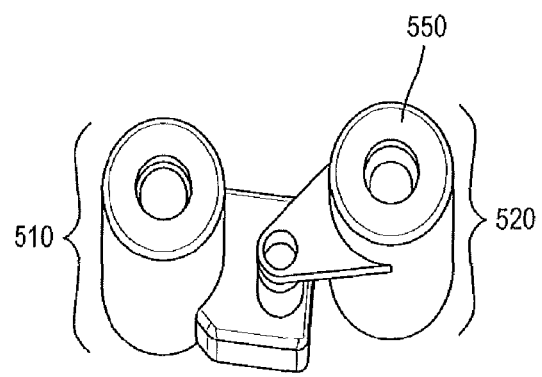
FIG. 7a shows an exemplary embodiment of a nut anti-loosening system with a pivot connection according to a subject of the invention.

FIG. 7a shows another exemplary embodiment of a nut anti-loosening system according to a subject of the invention. In this example, the anti-loosening function is ensured by a number of elements, including the two parts 510 and 520 which pivot with respect to one another by means of a pivot connection 530. Said pivot connection is produced by means of a circular clip.

The system additionally comprises adaptation parts 550 which connect the nuts on which the system is installed to the parts 510 and 520. These adaptation parts 550 are provided with a notched bore for securing them to the nuts.

Furthermore, these parts 550 can be produced with various bore diameters, with the result that the parts 510 and 520 can be used whatever the mechanical configuration of the wheel. Specifically, heavy goods vehicle wheels can be attached to a hub by means of nuts of varied sizes, the most common being nuts with a diameter of thirty-two, thirty-three or thirty-four millimetres. This part 550 can thus be produced with a bore diameter allowing the device to be adapted to all the sizes of the possible nuts.

The anti-loosening function is ensured by the association of the two parts 550 with the parts 510 and 520. In the event of loosening of a nut, the part 550 is caused to rotate by the nut.

Figure 7B:
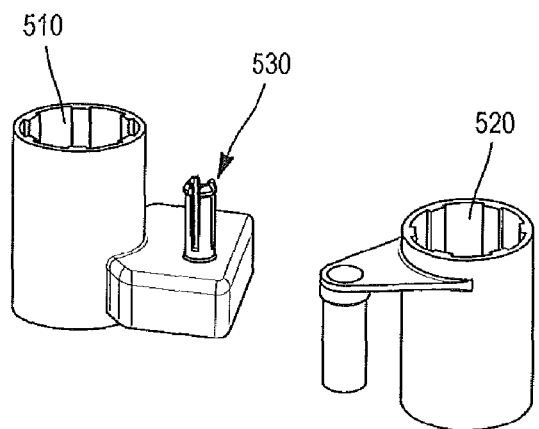
FIG. 7b shows parts of the system of FIG. 7a, and FIG. 7c shows the system of FIG. 7a used in a ten-nut configuration.

This rotation stops when the teeth formed on the outer part of the part 550 come into collision with notches formed in the parts 510 and 520. These notches are formed at the edge of the bore of the parts 510 and 520, and circularly distributed about these bores. In this example, their size is calculated so that the rotation of a nut about its axis cannot exceed 5 degrees. The detail of these notches and teeth can be seen in FIG. 7b.

Figure 7C:
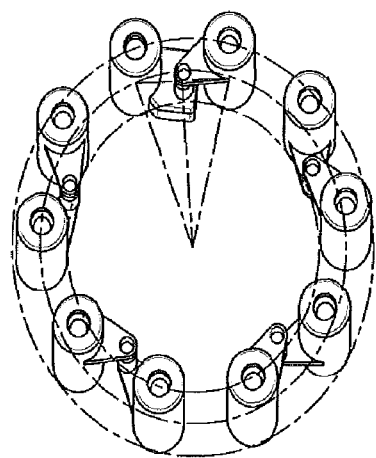

Another advantage of this configuration stems from the use of a pivot connection. This allows the adaptation of the system to wheel fastening configurations using a variable number of nuts. Specifically, heavy goods vehicle wheels most often use eight or ten nuts around the wheel. In this respect, FIG. 7c shows a ten nut configuration. According to the number of nuts, the distance separating two nuts varies. The use of a pivot connection makes it possible to compensate for this difference in spacing between the nuts and to make the system adaptable to a greater variety of wheels and, therefore, of vehicles.

Figure 8A:
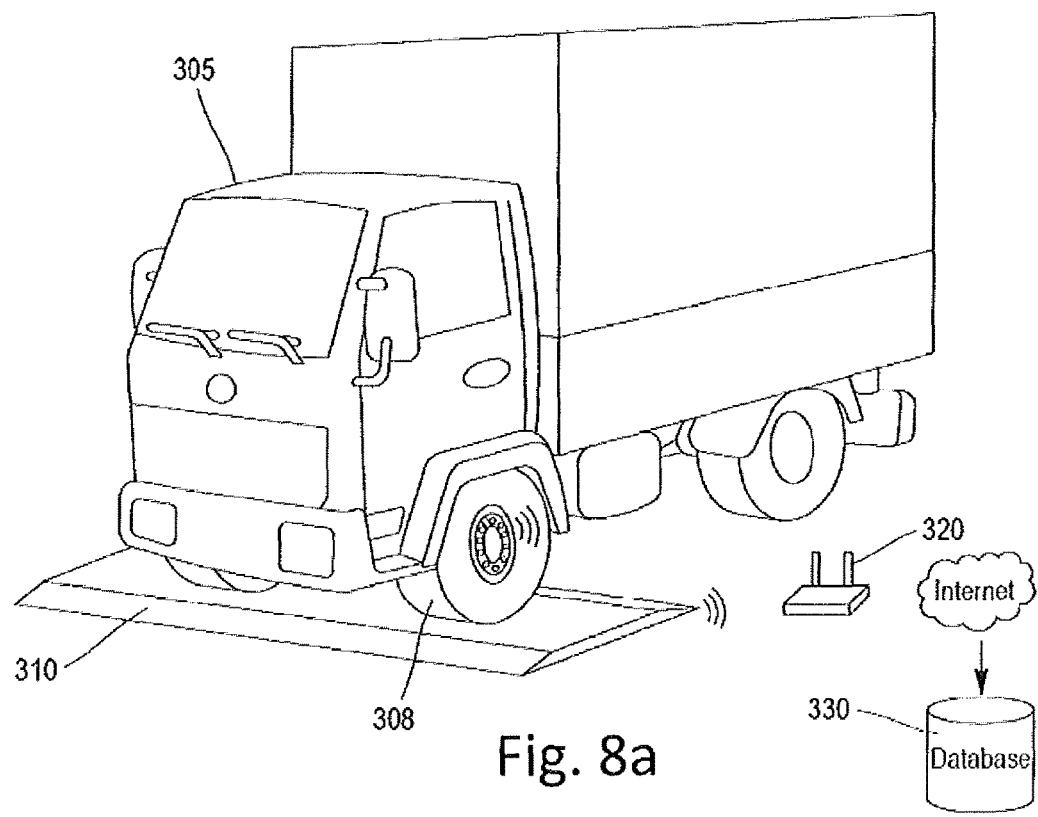
FIGS. 8a and 8b show a heavy goods vehicle equipped with a system for counting wheel revolutions, associated with means for transmitting the information measured to a remote database according to the invention.
Figure 8B:
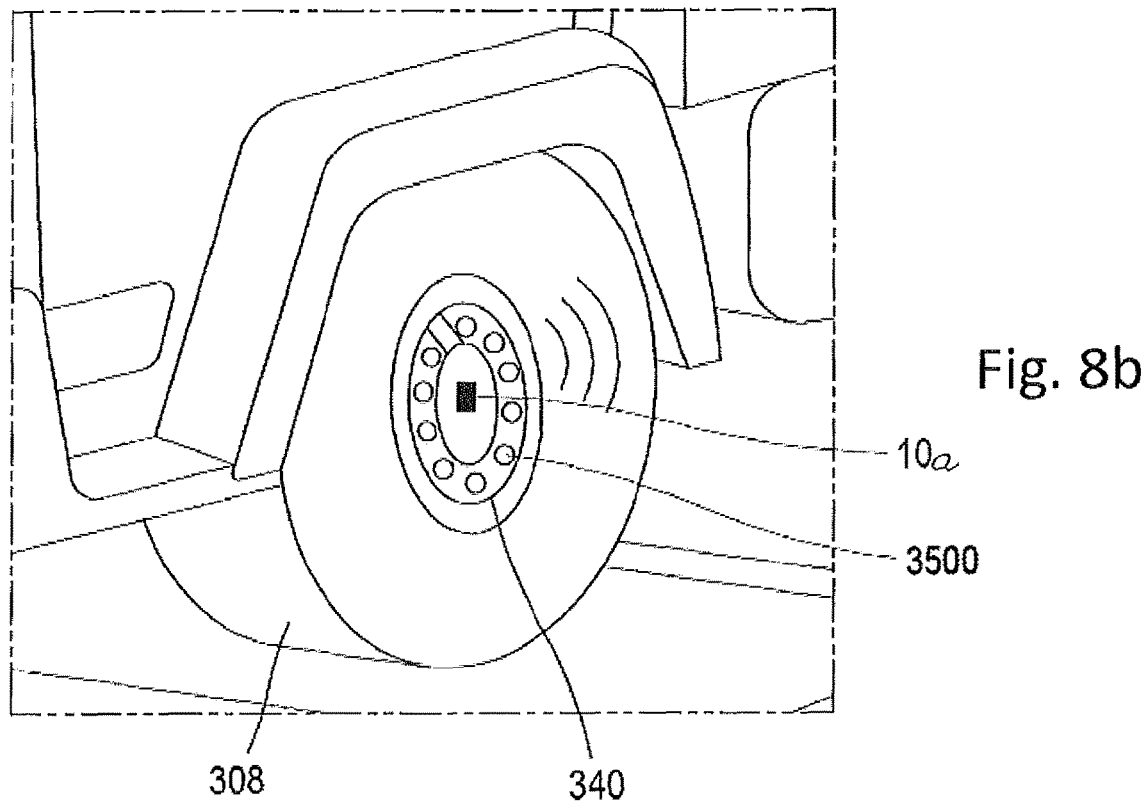

FIGS. 8a and 8b show a heavy goods vehicle 305 whose wheel 308 is provided with a system for counting wheel revolutions.

Although a heavy goods vehicle is represented here, the system according to the invention can be used for any type of vehicles, such as a passenger vehicle, a bus, a civil engineering vehicle or a two-wheeled vehicle.

In the example of FIG. 8a, a device for counting wheel revolutions is fastened to the wheel 308 at the front left of the vehicle 305. The detail of this mounting is visible in FIG. 5b.

This system for counting wheel revolutions can communicate the information measured by hertzian link to the gateway 320. The information is then transmitted to the database 330.

In one exemplary embodiment, not represented in this drawing, the speed hump 310 comprises wear sensors which, during the passage of the vehicle, make it possible to measure the wear of the wheel 308 and to communicate the information to the gateway 320.

Advantageously, the gateway 320 can be fastened against a wall of a building in the vicinity of the usual parking place of the vehicle 305. Thus, the system for counting wheel revolutions, according to a subject of the invention, transmits the information on the number of revolutions carried out by the wheels of the vehicle 305 to the gateway 320 each time it returns to its parking place.

In this example, the electronics for counting wheel revolutions, inserted into its box 10 as represented in FIG. 2, is fastened to part of a hub cap of the wheel 308.

In this example, a hub cap typically used in Europe on the front axles of heavy goods vehicles has been represented.

This type of hub cap is made up of a metal ring 340 which is held in position by the nuts 3500.

In general, this ring 340 is used alone, but it is possible to supplement it with a plastic flange which closes off the central hole in the ring 340.

In the example of FIG. 8b, the box 10a provided with clips as described above in the example of FIG. 2 is fastened to this plastic flange. Before doing this, three holes which are aligned and separated by the appropriate distance are made in said flange in order to allow the insertion of the clips and studs described in the example of FIG. 2a.

Alternatively, it is also possible to fasten the box 10a to a nut anti-loosening system which could, for example, be arranged on the wheel nuts of the rear axle of the vehicle 5.

In both cases, whether the device for counting wheel revolutions is fastened to the wheel by means of a hub cap, or using a nut anti-loosening device, the mounting operation is rapid and can be performed by a technician without special training.

Finally, in the example of FIGS. 8a and 8b, the database 330 contains information on the rolling radius or the perimeter of the tire mounted on the wheel 308. Thus, it is possible to execute a simple computer program tasked with calculating the kilometerage by using the number of wheel revolutions measured and by multiplying it by the perimeter of the tire mounted on the wheel 308.

In an alternative embodiment, the rolling radius of the tires can be recorded in the electronics for counting wheel revolutions contained in the box 10a.

The invention claimed is:

1. A counter system for counting revolutions of a wheel of a vehicle, the system comprising:
   an electronic counter that counts a number of revolutions of the wheel;
   a transmitter that transmits data from the electronic counter to a remote database;
   a housing configured to receive the electronic counter; and
   a connector configured to removably attach the housing to a nut anti-loosening device installed on the wheel,
   wherein the nut anti-loosening device comprises (a) a first part comprising a first fastening-on-nut device attached to a first rail and (b) a second part comprising a second fastening-on-nut device attached to a second rail,
   wherein the first rail and the second rail are slidably mounted upon one another such that a distance between the first fastening-on-nut device and the second fastening-on-nut device is adjustable,
   wherein the nut anti-loosening device has a plurality of openings, and
   wherein the connector comprises a plurality of male elements respectively corresponding to the plurality of openings of the nut anti-loosening device and being configured to fit into the plurality of openings of the nut anti-loosening device so as to removably attach the housing to the nut anti-loosening device.

2. The counter system according to claim 1, further comprising a force absorber configured to take up forces exerted on the housing.

3. The counter system according to claim 1, wherein the electronic counter includes a device for measuring a magnetic field, the device comprising a sensor.

4. The counter system according to claim 3, wherein the device for measuring a magnetic field further comprises another sensor, and
   wherein the sensor and the another sensor respectively have includes two sensors whose sensitive axes are oriented at 90 degrees with respect to each other.

5. The counter system according to claim 1, wherein the electronic counter includes a device for measuring a magnetic field, and
   wherein the device for measuring a magnetic field includes a single magnetic-field sensor.

6. The counter system according to claim 1, wherein the transmitter is structured to transmit the data by a Hertzian link.

7. The counter system according to claim 1, where the transmitter is a narrow-band type transmitter or an ultra-narrow-band type transmitter.

8. The counter system according to claim 1, wherein in the nut anti-loosening device, (a) the first fastening-on-nut device is attached to the first rail through a component configured to allow the first fastening-on-nut device to rotatably pivot relative to the first rail, and (b) the second fastening-on-nut device is attached to the second rail through a component configured to allow the second fastening-on-nut device to rotatably pivot relative to the second rail, whereby the first fastening-on-nut device and the second fastening-on-nut device can move relative to one another with an additional degree of freedom in addition to their relative slidable movement.

9. The counter system according to claim 8, wherein the component comprises a deformable rib.

10. The counter system according to claim 1, wherein the plurality of openings of the nut anti-loosening device comprises three openings arranged in a line, and wherein the plurality of male elements of the connector comprises three male elements arranged in a line.

11. The counter system according to claim 1, wherein the first fastening-on-nut device comprises a notched ring provided with plural notched sections, each neighboring pair of the sections having a radially-protruding U-shaped interface therebetween, the interface being deformable to allow the notched ring to accommodate different nut sizes.

12. A performance calculation system for determining tire performance of a tire of a wheel of a vehicle, the performance calculation system comprising:

the counter system according to claim 1, the counter system being used to measure a distance traveled; and a wear monitor configured to monitor a wear condition of the tire of the wheel.

13. The performance calculation system according to claim 12, wherein the wear monitor is structured to be placed on a ground surface and rolled over by the wheel or is a manually operated device.

\* \* \* \* \*